US009142830B2

(12) United States Patent
Xiao et al.

(10) Patent No.: US 9,142,830 B2
(45) Date of Patent: *Sep. 22, 2015

(54) PHASE SEPARATED SILICON-TIN COMPOSITE AS NEGATIVE ELECTRODE MATERIAL FOR LITHIUM-ION BATTERIES

(75) Inventors: Xingcheng Xiao, Troy, MI (US); Anil K. Sachdev, Rochester Hills, MI (US); Mark W. Verbrugge, Troy, MI (US); Ping Liu, Irvine, CA (US); John S Wang, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 702 days.

This patent is subject to a terminal disclaimer.

(21) Appl. No.: 13/234,209

(22) Filed: Sep. 16, 2011

(65) Prior Publication Data

US 2013/0071736 A1    Mar. 21, 2013

(51) Int. Cl.
*H01M 4/134* (2010.01)
*H01M 4/04* (2006.01)
*H01M 10/052* (2010.01)
*H01M 4/1395* (2010.01)
*H01M 4/38* (2006.01)
*B82Y 30/00* (2011.01)
*H01B 1/04* (2006.01)
*H01B 1/08* (2006.01)

(52) U.S. Cl.
CPC .......... *H01M 4/0426* (2013.01); *H01M 4/0423* (2013.01); *H01M 4/0483* (2013.01); *H01M 4/134* (2013.01); *H01M 4/1395* (2013.01); *H01M 4/386* (2013.01); *H01M 4/387* (2013.01); *H01M 10/052* (2013.01); *B82Y 30/00* (2013.01); *H01B 1/04* (2013.01); *H01B 1/08* (2013.01); *Y02E 60/122* (2013.01)

(58) Field of Classification Search
CPC ..... H01M 4/134; H01M 4/386; H01M 4/387; H01M 4/0423; H01M 10/052
USPC ......................................... 429/218.1, 231.95
See application file for complete search history.

(56) References Cited

U.S. PATENT DOCUMENTS

2002/0162606 A1*  11/2002  Turner et al. .................. 148/403
2007/0048612 A1*   3/2007  Nakajima et al. ........ 429/231.95
2010/0119942 A1*   5/2010  Kumar .......................... 429/220

OTHER PUBLICATIONS

Beaulieu et al., "The Electrochemical Reaction of Li with Amorphous Si-Sn Alloys," J. of the Electrochem. Soc., 150 (2) A149-A156 (2003).*

* cited by examiner

*Primary Examiner* — Zachary Best
(74) *Attorney, Agent, or Firm* — Reising Ethington P.C.

(57) ABSTRACT

A composite of silicon and tin is prepared as a negative electrode composition with increased lithium insertion capacity and durability for use with a metal current collector in cells of a lithium-ion battery. This electrode material is formed such that the silicon is present as a distinct amorphous phase in a matrix phase of crystalline tin. While the tin phase provides electron conductivity, both phases accommodate the insertion and extraction of lithium in the operation of the cell and both phases interact in minimizing mechanical damage to the material as the cell experiences repeated charge and discharge cycles. In general, roughly equal atomic proportions of the tin and silicon are used in forming the phase separated composite electrode material.

18 Claims, 4 Drawing Sheets

$Si_{48}Sn_{52}$

Si$_{40}$Sn$_{60}$

Si$_{48}$Sn$_{52}$

Si$_{68}$Sn$_{32}$

Higher Si Content

Lower Si Content

PHASE SEPARATED SILICON-TIN COMPOSITE AS NEGATIVE ELECTRODE MATERIAL FOR LITHIUM-ION BATTERIES

TECHNICAL FIELD

This invention pertains to the preparation of negative electrode materials for lithium-ion batteries. More specifically, this invention pertains to the preparation and use of composite particles that contain nanoscale islands of amorphous silicon phases embedded in crystalline or amorphous tin phases as negative electrode material for cyclic insertion and extraction of lithium in the operation of a lithium-ion battery. The combination of suitable atomic proportions of tin and silicon, and the sizes of the respective phases in such composites enables the insertion of increased amounts of lithium over repeated electrochemical cycles with less damage to the particulate negative electrode material.

BACKGROUND OF THE INVENTION

Lithium-ion batteries are used as electric storage systems for powering electric and hybrid electric vehicles. These batteries comprise a plurality of suitably interconnected electrochemical cells arranged to provide a predetermined electrical current at a specified electrical potential. In each such cell, lithium is transported as lithium ions from a negative electrode through a non-aqueous, lithium-containing, electrolyte solution to a lithium-ion-accepting positive electrode as an electronic current is delivered from the battery to an external load, such as an electric traction motor. A suitable porous separator material, infiltrated with the electrolyte solution and permeable to the transport of lithium ions in the electrolyte, is employed to prevent short-circuiting physical contact between the electrodes. Graphite has been used as a negative electrode material and bonded in a thin electrode layer on a copper current collector. During charging of the cells, lithium is inserted into the graphite (lithiation, forming $LiC_6$, about 372 mAh/g) and extracted from the graphitic carbon during discharging (delithiation). A suitable particulate material for receiving and storing inserted lithium during discharge of each cell is used as the positive electrode material. Examples of such positive electrode materials include lithium cobalt oxide ($LiCoO_2$), a spinel lithium transition metal oxide such as spinel lithium manganese oxide ($LiMn_xO_y$), a lithium polyanion such as a nickel-manganese-cobalt oxide [$Li(Ni_xMn_yCo_z)O_2$], lithium iron phosphate ($LiFePO_4$), or lithium fluorophosphate ($Li_2FePO_4F$), or a mixture of any of these materials. Suitable positive electrode materials are often bonded as a thin layer to an aluminum current collector. The electrochemical potential of such lithium ion cells is typically in the range of about 2 to 4.5 volts.

The use of lithium-ion batteries to power electric motors in automotive vehicles has led to the need for higher gravimetric and/or volumetric capacity batteries. While graphitic carbon is a durable and useful lithium-intercalating, negative electrode material for lithium-ion cells, it has a relatively low capacity for such lithium insertion. Other potential negative electrode materials such as silicon (theoretical capacity, 3600 mAh/g for $Li_{15}Si_4$) and tin (theoretical capacity, 992 mAh/g for $Li_{22}Sn_5$) have much higher theoretical capacities than graphite for lithium insertion. However, the volume change of up to 300 volume percent for silicon during lithiation and delithiation processes leads to fracture of the active silicon material and/or loss of electrical contact with the conductive additives or the current collectors. And tin has the same problem of a large volume expansion upon lithiation, leading to rapid capacity degradation.

The basic mechanism responsible for the loss of capacity of a battery due to fracture of the electrode materials in its cells is the loss of electrical contact with conductive material and the creation of new surfaces, which irreversibly consume the active lithium to form new solid electrolyte interfaces. Both problems shorten the effective cycling capacity of a battery. There remains a need for a more effective way or material form of utilizing silicon or tin in negative electrodes of lithium-ion cells.

SUMMARY OF THE INVENTION

In accordance with embodiments of this invention, an improved negative electrode material is formed by combining silicon and tin as intermixed, but immiscible, solid phases. A particulate composite of silicon and tin is formed in which the silicon and tin are phase-separated. Both phases are receptive to the insertion and extraction of lithium atoms. The composite is formed with a two-phase or multi-phase structure that is nanometer to micrometer in characteristic length and is achieved by controlling the synthesis process to produce the mixed phases to be below the critical size for the generation of micro-cracks due to the repeated insertion of lithium into the mixed phases. In a preferred embodiment, confined particulate architectures are formed wherein the silicon phases are separated in a tin phase matrix. Such a microstructure provides several advantages: (1) the tin phase is electrically conductive, which enables electrons to reach the island-like silicon phase particles, (2) the diffusion of lithium in tin is much faster than in silicon, which can reduce the concentration gradient of lithium ions through the larger composite particles of silicon and tin, in effect reducing the diffusion induced stress to mitigate the fracture of the larger composite particles, (3) if a crack is generated in the composite material, the relatively soft tin matrix tends to absorb the elastic strain energy and prevent the micro-cracks from propagating, and (4) the immiscible characteristics of silicon and tin and their phase separation minimizes electrochemical sintering and thus prevents coalescence of the particles that would otherwise lead to rapid mechanical degradation of the electrode material.

The phase separated particle composites may be produced, for example, by rapid solidification practices (e.g., melt spinning) from a homogeneous liquid mixture of elemental tin and silicon. In another example, phase separated composites may be formed by sputtering of separate sources of tin and silicon and co-depositing phase separated mixtures of tin and silicon in predetermined proportions as an electrode film on a suitable surface, such as a copper current collector. In general, it is preferred to prepare a phase separated composite of about forty to sixty atomic percent of silicon and the balance tin for negative electrode materials for lithium-ion cells.

In accordance with practices of the invention, the mechanical degradation that occurs when pure tin or silicon is used for lithium insertion is thus mitigated by tuning the Si/Sn ratio of the tin-silicon composite. We also demonstrate that at suitable Si/Sn ratios, phase separation occurs with amorphous phase clusters of silicon being embedded in a generally continuous phase of crystalline or amorphous tin. The resulting negative electrode materials exhibit significant improvements in charge storage capability along with excellent cycling stability.

Thus, in accordance with practices of the invention, phase separated composites of tin and silicon are formed as relatively thin layers on a suitable current collector for use as negative electrode material in the cells of a lithium ion battery. By thus using this phase separated combination of tin and silicon, the lithium-insertion capacity of each cell is increased to improve the volumetric and/or gravimetric capacity of lithium-ion batteries.

Other objects and advantages of the invention will be apparent from a detailed description of practices of embodiments of the invention which follows in this specification.

BRIEF DESCRIPTION OF THE DRAWINGS

FIG. 2 also illustrates the metallic current collectors that support the respective electrode materials. The elements of the cell are shown separated for illustration, but they are actually in compressed face-to-face contact and the electrode materials are formed on, or bonded to, their respective current collectors.

In FIG. 3A the composition in atomic percent proportions is $Si_{40}Sn_{60}$, in FIG. 3B the composition is $Si_{48}Sn_{52}$, and in FIG. 3C the composition is $Si_{68}Sn_{32}$.

FIG. 4A is of higher silicon content (about 60 atomic percent silicon and the balance tin) and FIG. 4B is of lower silicon content (about thirty atomic percent silicon).

FIG. 5A is at the second cycle and FIG. 5B is at the twentieth cycle.

DESCRIPTION OF PREFERRED EMBODIMENTS

Figure 1:
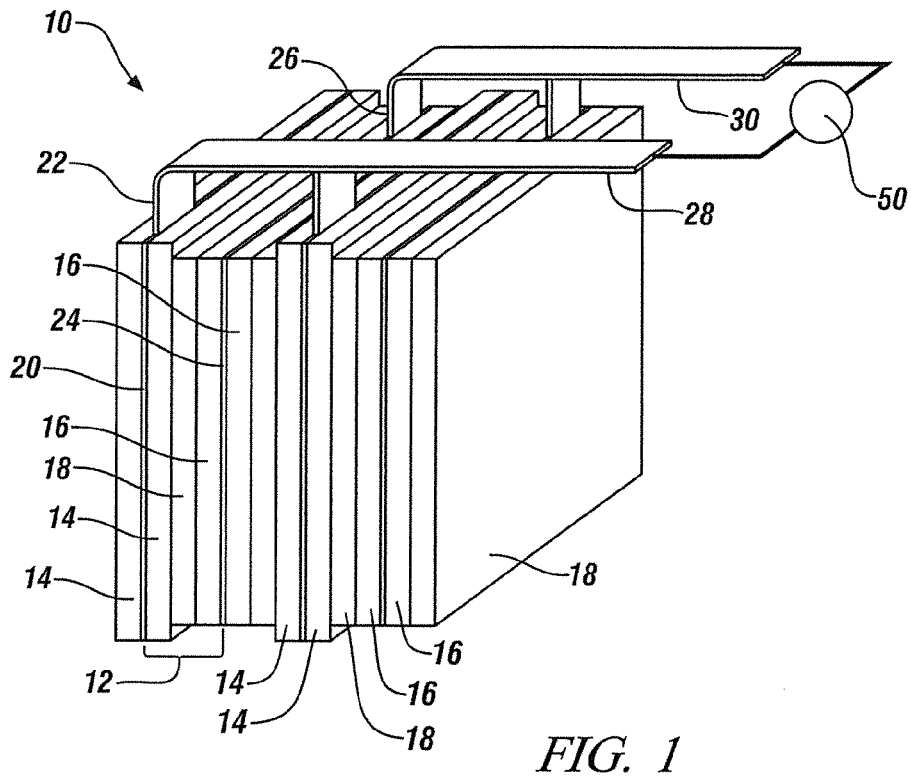
FIG. 1 is an enlarged schematic illustration of a few electrochemical cells of an exemplary lithium ion battery arrangement. Each cell includes a thin, rectangular negative electrode that may include the phase separated tin and silicon composite material of this invention, a like-shaped positive electrode, and a separator sandwiched between that electrodes.

An exemplary and generalized illustration of a lithium-ion battery 10 is depicted in FIG. 1. The lithium-ion battery 10 shown here includes several thin rectangular-shaped electrochemical battery cells 12 that are each bracketed by metallic current collectors. The electrochemical battery cells 12 are stacked side-by-side in a modular configuration and, in this example, connected in parallel. A lithium-ion battery 10 may be formed of many like electrochemical cells in electrical series or in parallel connection to form a lithium ion battery that exhibits the voltage and current capacity demanded for a particular application. It should be understood the lithium ion battery 10 shown here is only a schematic illustration. FIG. 1 is presented to show the relative position and physical interactions of the various components that constitute the electrochemical battery cells 12 (i.e., the electrodes and the separator); it is not intended to inform the relative sizes of the electrochemical battery cells' components, to define the number of electrochemical battery cells 12 in the lithium ion battery 10, or to limit the wide variety of structural configurations the lithium ion battery 10 may assume.

The electrochemical cell 12 (one indicated) contained in the lithium ion battery 10 includes a negative electrode 14, a positive electrode 16, and the separator 18 situated between the two opposing electrodes 14, 16. Each of the negative electrode 14, the positive electrode 16, and the separator 18 is wetted with a liquid electrolyte solution that enables the transport of lithium ions between the electrodes 14, 16. A negative-electrode metallic current collector 20 (typically, copper) that includes a negative polarity tab 22 is located between the back-to-back negative electrodes 14 of adjacent electrochemical cells 12. Likewise, a positive-side metallic current collector 24 (typically, aluminum) that includes a positive polarity tab 26 is located between neighboring positive electrodes 16. The negative polarity tab 22 is electrically coupled to a negative terminal 28 and the positive polarity tab 26 is electrically coupled to a positive terminal 30. Each electrode material 14, 16 is typically formed on or bonded to its respective metallic current collector 20, 24. An applied compressive force usually presses the metallic current collectors 20, 24 and their electrodes 14, 16 against the separator 18 to achieve intimate interfacial contact between adjacent contacting components. Negative terminal 28 and positive terminal 30 are connected to an electrical power consuming load 50. For example, a suitable battery pack comprising many like individual cells may be provided to power an electric traction motor to drive the wheels in an automotive vehicle. In such a battery pack many cells are connected in groups in electrical parallel arrangement for providing suitable energy capacity and many groups are connected in series to provide a suitable electrical voltage potential.

Figure 2:
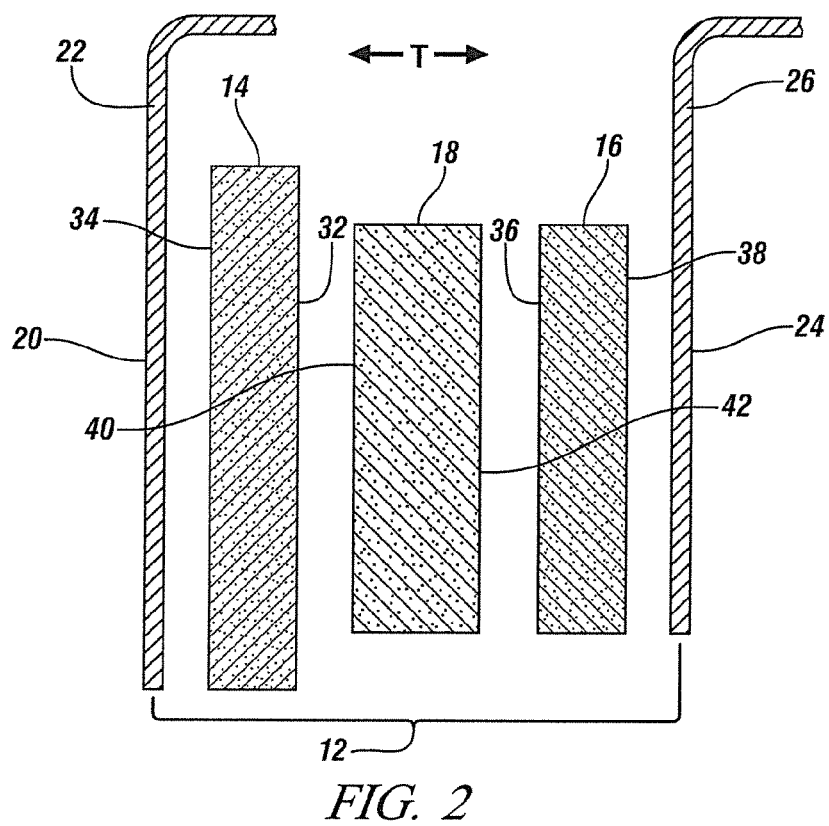
FIG. 2 is a further enlarged and exploded cross-sectional view of one of the electrochemical cells shown in FIG. 1.

An exploded cross-sectional view of the electrochemical battery cell 12 and its associated metallic current collectors 20, 24 is generally illustrated in FIG. 2. The negative electrode 14 includes an inner face surface 32 and an outer face surface 34 relative to the location of the separator 18. The positive electrode 14 similarly includes an inner face surface 36 and an outer face surface 38. The inner face surface 32 of the negative electrode 14 may, but is not required to, encompass a larger two-dimensional surface area than the inner face surface 36 of the positive electrode 16, as shown. When assembled into the electrochemical battery cell 12, the inner face surfaces 32, 36 of the negative and positive electrodes 14, 16 confront one another and are pressed against a negative-side major face surface 40 and a positive-side major face surface 42 of the separator 18, respectively. Such pressed-engagement occurs generally uniformly along the entire interface of the major face surfaces 40, 42 of the separator 18 and the corresponding portions of the inner face surfaces 32, 36 of the electrodes 14, 16. The negative-side metallic current collector 20 is formed on or joined to the outer face surface 34 of the negative electrode 14 and the positive-side metallic current collector 24 is formed on or joined in electrical contact with the outer face surface 38 of the positive electrode 16. In many embodiments of this invention a composite tin-silicon negative electrode material is formed directly on the surfaces of a copper negative electrode current collector 20 Both of the metallic current collectors 20, 24 engage their respective electrode outer face surfaces 34, 38 over an appreciable interfacial surface area to facilitate the efficient collection and conduction of free electrons.

In many lithium-ion batteries the elements of electrochemical cells 12 are made of materials such that they are generally thin and flexible. By way of illustrative example, a typical thickness (T in FIG. 2) of the electrochemical cell 12 extending from the outer face surface 34 of the negative electrode 12 to the outer face surface 38 of the positive electrode 16 may about 80 μm to about 350 μm. Each electrode 14, 16 may be about 30 μm to 150 μm thick and the separator 18 may be about 20 μm to 50 μm thick. The metallic current collectors 20, 24 may be about 5 μm to 20 μm thick. The relatively thin and flexible nature of the elements of the electrochemical cell 12 and its associated metallic current collectors 20, 24 allows them to be rolled, folded, bent, or otherwise maneuvered into a variety of lithium-ion battery configurations depending on design specifications and spatial constraints. The lithium ion battery 10 may, for example, include a number of distinct electrochemical cells 12 that have been fabricated, cut, aligned, and laid-up next to one another or, in an alternative embodiment, the cells 12 may be derived from a continuous layer that is folded back-and-forth over itself many times.

Practices of this invention are directed to the formation of higher current capacity and more durable materials for negative electrodes of lithium-ion electrochemical cells. Phase separated composites of tin and silicon are prepared for this purpose.

Several combinations of atomic proportions of Si and Sn were co-deposited as composite thin films in a Gamma 1000 sputtering system (Surrey Nanosystems, UK). Twelve thin film combinations of silicon and tin were prepared, including respectively, in atomic percent, 22.7%, 27.2%, 34.4%, 39.9%, 42.7%, 48.1%, 57.6%, 64.4%, 66.3%, 71.5%, 77.3, and 81.8% silicon and the balance tin. In each preparation a roughened copper foil was used to provide good adhesion between the sputtered Si—Sn thin films and the copper current collector. The deposition plasma for each constituent material (Si and Sn) was created with RF and DC power, respectively, applied to two magnetron guns under an argon flow of 14 sccm. The deposition rates of tin and silicon were separately controlled to obtain the above specified different atomic proportions of these elements. The dynamic pressure during the growth of the films was 3 mTorr, and the substrate was kept at room temperature.

Ex situ X-ray diffraction (XRD) was used to study the structures of the thin films deposited on the Cu current collectors. All samples were examined using Cu Kα radiation in a Bruker AXS general area detector diffractometer system (GADDS). The diffraction images were collected for a period of 5 min with a 0.5-mm collimator and a sample-to-detector distance of 150 mm. The composition of each sample pad was determined by electron probe microanalysis (EPMA), while selected samples were characterized with JEOL 2100F AC transmission electron microscope operating at 200 kV. Scanning transmission electron microscopy (STEM) images were collected using a high angle annular dark field (HAADF) detector.

All electrochemical experiments were carried out in Swagelok cells inside an argon-filled glove box. Pure lithium metal was used for the counter electrode for the half-cell tests. The electrolyte solution was 1 M $LiPF_6$ in ethylene carbonate (EC) and dimethyl carbonate (DMC) (1:1 v/v). A Celgard 3501 (1 μm thick microporous polypropylene film with 40% porosity) was used as the separator. Galvanostatic tests for all samples were performed with an Arbin BT-2000 battery testing station at a cycling voltage between 10 mV to 1.5 V (relative to a $Li/Li^+$ electrode).

The XRD results included the strong Cu diffraction peaks observed from the substrate and revealed several Sn peaks, indicating that the Sn phase was crystalline. No Si diffraction peaks were detected, indicating the amorphous nature of the Si. This was expected since the deposition temperature is too low for Si to develop a crystalline phase. No peaks representing any other Si—Sn phase were observed in any of the sputtered samples examined, which clearly demonstrated that the Si and Sn were phase separated, in agreement with the known immiscibility of Si and Sn. This nanostructure induced by phase separation is very critical to significantly improve its electrochemical performance. The overall mechanism for this will be further described in this specification.

Figure 3A:
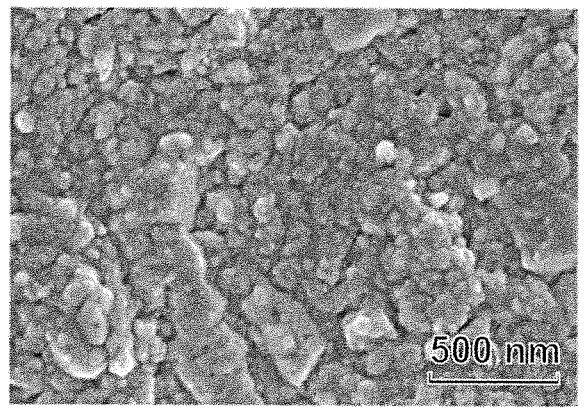
FIGS. 3A-3C are scanning electron microscope images (SEM) illustrating the surface morphologies of phase separated $Si_nSn_{1-n}$ compositions formed by sputtering of tin and silicon from separate targets onto a copper strip substrate.
Figure 3B:
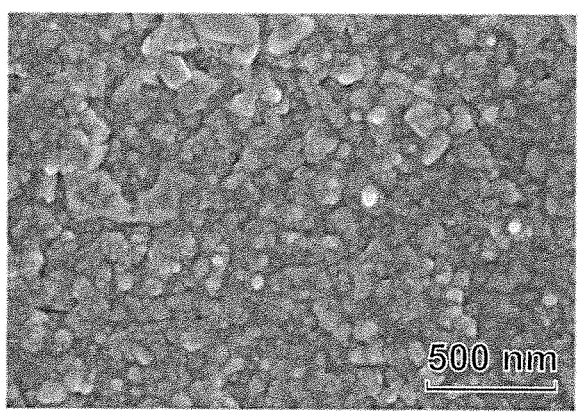
Figure 3C:
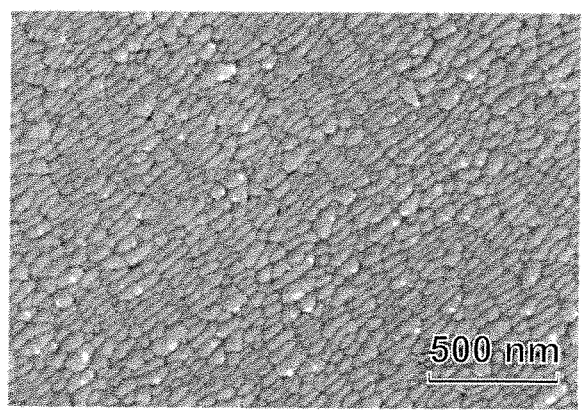
Figure 4A:
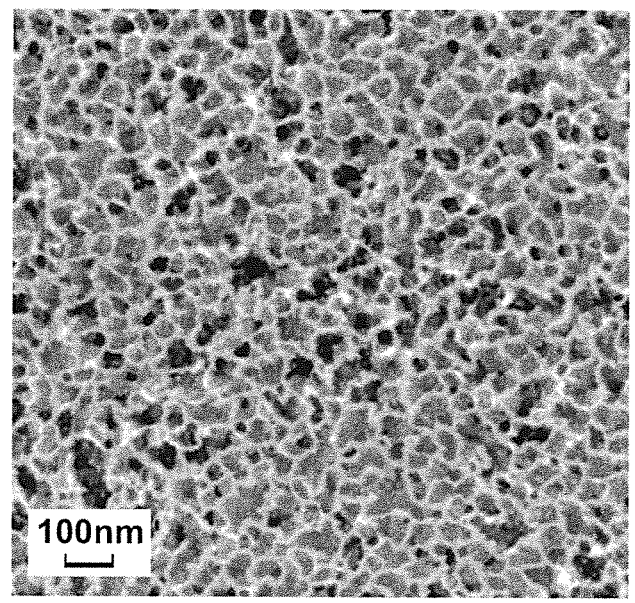
FIGS. 4A and 4B are High Angle Angular Dark Field (HAADF) scanning transmission electron microscope (STEM) images showing the phase separation of silicon and tin in films produced by sputtering. Silicon is the darker phase and tin is the brighter phase.
Figure 4B:
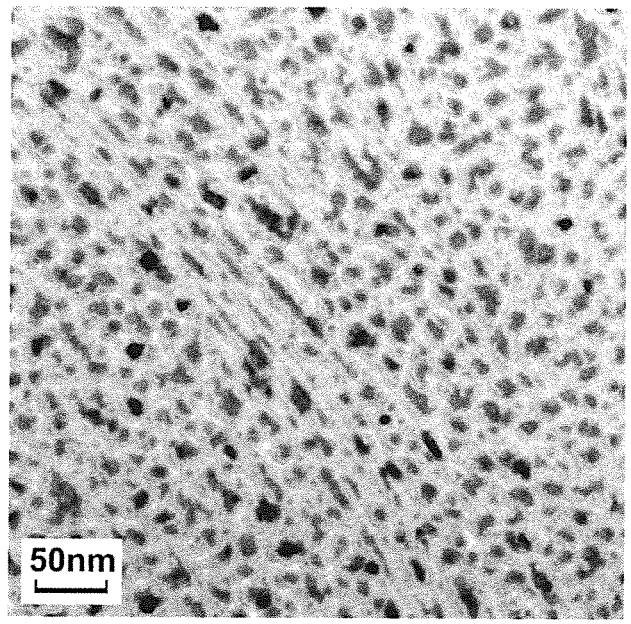

Based on the well-known Scherrer equation, the average Sn crystallite size estimated from the several X-ray diffraction patterns in was 20 to 50 nm. Those sputtered films containing higher Si contents led to smaller Sn grains, as confirmed from the SEM images in FIGS. 3A-3C, which show that the surface morphology associated with the Sn grain size becomes rougher with increasing Si content. With the high sensitivity to atomic number contrast, detailed insight was gained with HAADF STEM imaging. As shown in FIGS. 4A and 4B, the phase separation between the Sn (bright features) and the Si (dark features) results in discrete amorphous Si nanoparticles dispersed in a continuous crystalline Sn matrix. The Si particle size ranged from 30 to 70 nm for high Si contents (about sixty atomic percent silicon in FIG. 4A), with an average value of 50 nm, and decreased with decreasing amounts of Si in the alloy (about thirty atomic percent silicon in FIG. 4B). The Sn thickness between the Si particles was around 20 nm for the high Si content alloy, and increased with decreasing Si.

Figure 5A:
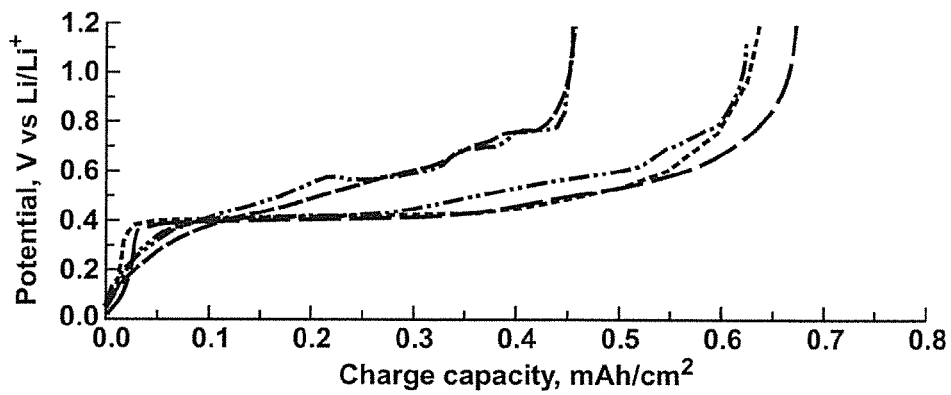
FIGS. 5A and 5B are galvanostatic charge curves (Potential, Volts, Li/Li$^+$ vs. Charge Capacity mAh/cm$^2$) at a rate of C/10 for five indicated different tin/silicon compositions.
Figure 5B:
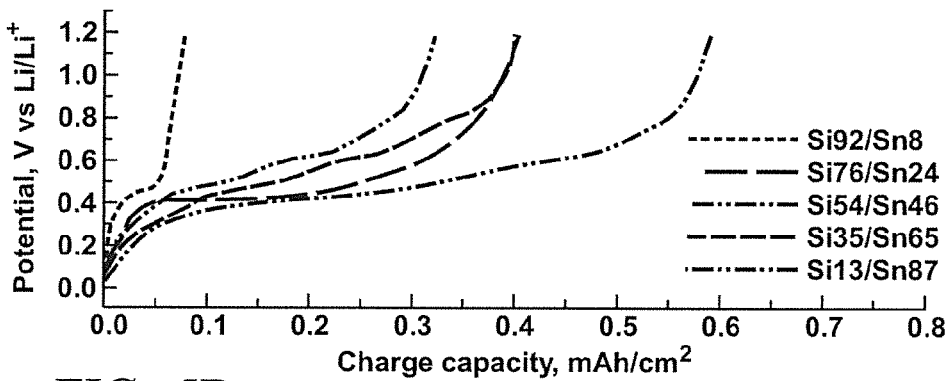
Figure 6:
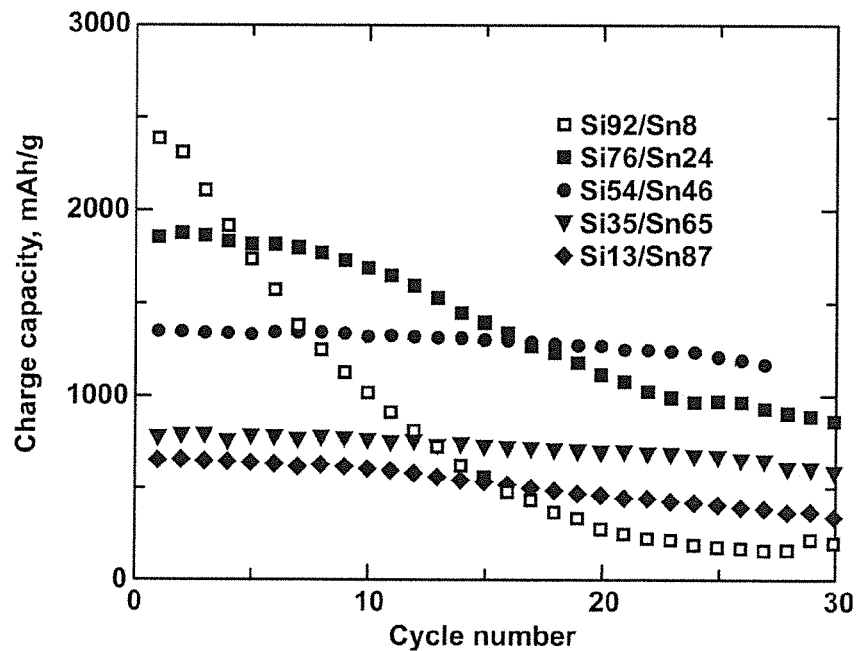
FIG. 6 is a graph of Charge capacity, mAh/g vs. Cycle number for five indicated different tin/silicon compositions.

The effects of Si/Sn composition ratios on galvanostatic charge/discharge behaviors were evaluated. A comparison of Si—Sn films with five of the different Si/Sn composition ratios at a charge rate of C/10 is shown in FIGS. 5A ($2^{nd}$ cycle) and 5B ($20^{th}$ cycle). During the initial cycles (as represented in the second cycle, FIG. 5A), the cell capacities are higher with increasing Si content, since the theoretical capacity of $Li_{15}Si_4$ (3580 mAh/g) is much larger than that of $Li_{4.4}Sn$ (992 mAh/g). However, at very high Si content ($Si_{92}/Sn_8$), the capacity was lower (around 2400 mAh/g, FIG. 6) suggesting that not all the Si is accessible to accommodate the Li-ions due to the dramatic volume change that occurs, and also the high intrinsic resistance of Si. Referring still to FIGS. 5A and 5B, the voltage profiles of Si—Sn alloys also reflected the charge characteristics of each individual Si and Sn phase. For example, for a high Sn content, one can clearly observe multiple constant-voltage plateaus for crystalline Sn. These plateaus correspond to different solid-solution regions wherein each plateau represents regions of co-existence of two-phases: $Li_{22}Sn_5$—$Li_7Sn_3$, $Li_7Sn_3$—LiSn, LiSn—$Li_2Sn_5$, and $Li_2Sn_5$—Sn, during the $Li^+$ extraction process from 0 to 1V. As the Sn content decreases, the constant-voltage plateaus of Sn become less visible while a broad constant voltage plateau becomes apparent near 0.4 V. This broad featureless voltage characteristic is a typical representation of amorphous Si during charge (Si alloy delithiation process). This distinguishing characteristic feature from both Si and Sn further demonstrates that the Si and Sn were phase separated from each other.

We also investigated the effects of Si/Sn composition ratios on cycling stability. FIG. 5B shows the charge characteristics of Si—Sn films after 20 cycles. The constant-voltage plateaus of crystalline Sn faded upon cycling; indicating that the Sn is tending to became amorphous. The cycling performance of all five Si—Sn samples is also summarized in FIG. 6. While the capacity retention of 65:35 and 46:54 at. % (Sn:Si) ratios were better than those with high Si content, the 46 Sn:54 Si ratio was the most promising composition because of its high specific charge capacity. At 1400 mAh/g, the electrode reached 90% of its theoretical capacity (1550 mAh/g). This composition offers a good balance between electrical conductivity and the ability to accommodate the large volume expansion.

In general, it is preferred to employ silicon/tin compositions which are close to a fifty-fifty atomic percent mixture of the two elements. Suitable mixtures include forty to sixty atomic percent of silicon and the balance tin. These compositions are found to provide improved charge capacity for a greater number of charge and discharge cycles. The compositions are prepared by a method that forms thin films of the silicon/tin composite with the elements in separated phases in which the silicon phase is amorphous and the tin phase is initially crystalline. Preferably, the amorphous silicon phase is dispersed in a crystalline tin matrix phase.

The phase separated tin-silicon compositions may be prepared by a rapid solidification process from a homogenous melt of suitable proportions of tin and silicon. For example, the process may be practiced as follows:

1. Silicon and tin are melted together in a predetermined atomic proportion. In many embodiments of the invention prepared proportions lie in the range of forty to sixty atomic percent silicon and the balance tin.

2. The melt is progressively rapidly solidified to form particles, flakes, or ribbons.

3. The particles are comminuted, such as by cryogenic ball milling at a suitably low temperature below 0° C. and down to −30° C. in inert atmosphere in order to avoid oxidation of the particles, to form generally uniformly shaped particles of one to five microns or so (or smaller) in largest dimension.

4. In some embodiments, the particles may be annealed, if necessary, to induce phase separation by forming nanoscale islands of amorphous silicon phases embedded in a tin matrix. Such phase separated composite particles of silicon and tin are considered the active material for a negative electrode of a lithium-ion cell.

5. The particles of active material are bonded to a suitable metal current collector, preferably a copper current collector in forming a negative electrode. For example, particles of active electrode material may be mixed with a suitable polymeric binder, such as polyvinylidene difluoride (PVDF) and carbon black in a weight ratio for example of 80:10:10. An inert liquid vehicle may be temporarily used for distributing the mixture over one or both opposing surfaces of a thin current collector strip. The liquid vehicle is removed and the mixture bonded to the collector film surfaces with the polymer binder. The electrical conductivity of the silicon-tin composite is further increased by the particles of carbon black.

Thus, the phase separated films are suitably formed over a predetermined area and to a determined thickness on a copper current collector for assembly as the negative electrode material into lithium-ion electrochemical cells. The total amount of the negative electrode material is selected to provide a desired electrode capacity.

Practices of the invention have been described for purposes of illustration and not of limitation of the scope of the invention.

The invention claimed is:

1. A lithium-ion secondary electrochemical cell or battery comprising a negative electrode composition; lithium being inserted into a negative electrode composition during charging of the cell or battery and lithium being extracted from the negative electrode composition during discharge of the cell or battery; the negative electrode material comprising a composite that consists of tin and silicon in which the tin and silicon are present in separate phases, the composite being further characterized by a phase of nanoscale islands of silicon, 30 to 70 nanometers in size, dispersed in a matrix phase of tin, the tin phase being crystalline or amorphous and the silicon phase being amorphous.

2. A lithium-ion secondary electrochemical cell or battery as recited in claim 1 in which the composite of tin and silicon consists of forty to sixty atomic percent silicon and the balance tin.

3. A lithium-ion secondary electrochemical cell or battery as recited in claim 1 in which the composite of tin and silicon consists of forty-eight to fifty-two atomic percent silicon and the balance tin.

4. A lithium-ion secondary electrochemical cell or battery as recited in claim 1 in which the composite of tin and silicon is characterized by tin phase crystals having a size in the range of twenty nanometers to fifty nanometers.

5. A lithium-ion secondary electrochemical cell or battery as recited in claim 1 in which the negative electrode material, the composite of tin and silicon has been formed as an adherent film by sputtering of tin and silicon onto a surface of a metal current collector for the negative electrode material.

6. A lithium-ion secondary electrochemical cell or battery as recited in claim 1 in which the composite of tin and silicon has been formed as an adherent film by sputtering of tin and silicon onto a surface of a metal current collector for the negative electrode material, the sputtered film having a thickness up to about five micrometers.

7. A lithium-ion secondary electrochemical cell or battery as recited in claim 1 in which the composite of tin and silicon has been formed by rapid solidification of a molten liquid of tin and silicon into solid particles of the phase separated composite of tin and silicon.

8. A lithium-ion secondary electrochemical cell or battery as recited in claim 7 in which the solid particles are reduced in size to about one to five micrometers and then mixed with a polymeric binder and carbon black and bonded to a metal current collector for the negative electrode material.

9. A lithium-ion secondary electrochemical cell or battery as recited in claim 7 in which the solid particles are reduced in size by cryogenic ball milling at a temperature below 0° C. down to −30° C. in a non-oxidizing atmosphere.

10. A lithium-ion secondary electrochemical cell or battery comprising a negative electrode composition and a positive electrode composition; lithium being inserted into the negative electrode composition and extracted from the positive electrode composition by transport of lithium through a lithium-containing electrolyte during charging of the cell or battery, and lithium being extracted from the negative electrode composition and inserted into the positive electrode composition by transport of lithium through a lithium-containing electrolyte during discharge of the cell or battery; the negative electrode material comprising a composite that consists of tin and silicon in which the tin and silicon are present in separate phases, the composite being further characterized by a phase of nanoscale islands of silicon, 30 to 70 nanometers in size, dispersed in a matrix phase of tin, the tin phase being crystalline or amorphous and the silicon phase being amorphous.

11. A lithium-ion secondary electrochemical cell or battery as recited in claim 10 in which the positive electrode composition comprises a crystalline metal oxide composition also containing lithium.

12. A lithium-ion secondary electrochemical cell or battery as recited in claim 10 in which the composite of tin and silicon consists of forty to sixty atomic percent silicon and the balance tin.

13. A lithium-ion secondary electrochemical cell or battery as recited in claim 10 in which the composite of tin and silicon consists of forty-eight to fifty-two atomic percent silicon and the balance tin.

14. A lithium-ion secondary electrochemical cell or battery as recited in claim 10 in which the composite of tin and silicon is characterized by tin phase crystals having a size in the range of twenty nanometers to fifty nanometers.

15. A lithium-ion secondary electrochemical cell or battery as recited in claim 10 in which the composite of tin and silicon has been formed as an adherent film by sputtering of tin and silicon onto a surface of a metal current collector for the negative electrode material, the sputtered film having a thickness up to about five micrometers.

16. A lithium-ion secondary electrochemical cell or battery as recited in claim 10 in which the composite of tin and silicon has been formed by rapid solidification of a molten liquid of tin and silicon into solid particles of the phase separated composite of tin and silicon.

17. A lithium-ion secondary electrochemical cell or battery as recited in claim 16 in which the solid particles are reduced in size to about one to five micrometers and bonded to a metal current collector for the negative electrode material.

18. A lithium-ion secondary electrochemical cell or battery as recited in claim 16 in which the solid particles are reduced in size by cryogenic ball milling at a temperature below 0° C. down to −30° C. in a non-oxidizing atmosphere.

\* \* \* \* \*